United States Patent
Etter et al.

(10) Patent No.: US 9,693,651 B2
(45) Date of Patent: *Jul. 4, 2017

(54) BEVERAGE COLLECTOR FOR COLLECTING CENTRIFUGED LIQUID AND CENTRIFUGAL BEVERAGE MACHINE USING SUCH COLLECTOR

(75) Inventors: Stefan Etter, Kehrsatz (CH);
Alexandre Perentes, Lausanne (CH);
Christian Jarisch, Lutry (CH);
Manuela Rothacher Etter, legal representative, Kehrsatz (CH)

(73) Assignee: Nestec S.A., Vevey (CH)

( * ) Notice: Subject to any disclaimer, the term of this patent is extended or adjusted under 35 U.S.C. 154(b) by 563 days.

This patent is subject to a terminal disclaimer.

(21) Appl. No.: 14/237,784

(22) PCT Filed: Aug. 6, 2012

(86) PCT No.: PCT/EP2012/065317
§ 371 (c)(1),
(2), (4) Date: May 23, 2014

(87) PCT Pub. No.: WO2013/020940
PCT Pub. Date: Feb. 14, 2013

(65) Prior Publication Data
US 2014/0332101 A1    Nov. 13, 2014

(30) Foreign Application Priority Data

Aug. 9, 2011 (EP) .................................. 11176918

(51) Int. Cl.
*A47J 31/22* (2006.01)
*A47J 31/46* (2006.01)

(52) U.S. Cl.
CPC .............. *A47J 31/46* (2013.01); *A47J 31/22* (2013.01); *Y10T 137/8593* (2015.04)

(58) Field of Classification Search
CPC ...... A47J 31/22; A47J 31/46; Y10T 137/8593
USPC ..... 99/295, 302 C, 279, 299, 307, 313, 304, 99/300, 316; 137/561 R; 426/433, 431, 426/410
See application file for complete search history.

(56) References Cited

U.S. PATENT DOCUMENTS

2007/0079708 A1    4/2007  Li
2009/0317508 A1*  12/2009  Lee .................... B29C 45/1753
                                                                425/556
2014/0331868 A1*  11/2014  Novak .................. B65D 85/73
                                                                99/323.2

FOREIGN PATENT DOCUMENTS

DE          3529913        3/1987
DE          3529913 A1  *  3/1987    .............. A47J 31/22
(Continued)

OTHER PUBLICATIONS

DE 3529913 A1 Machine Translation (Espacenet translation, translated Aug. 2016).*

*Primary Examiner* — Phuong Nguyen
(74) *Attorney, Agent, or Firm* — K&L Gates LLP

(57) ABSTRACT

Beverage collector (11) for collecting a centrifuged brewed liquid coming from a rotating brewing unit (2); said collector comprising: —a collecting track (13) forming an annular cavity and, —at least one outlet (14) extending radially in the collecting track (13) for allowing the brewed liquid received in the collecting track to evacuate out of the collecting track, wherein said collecting track comprises at least one ramp surface (15) lowering in the annular direction (O) towards the outlet (14).

14 Claims, 7 Drawing Sheets

(56) References Cited

FOREIGN PATENT DOCUMENTS

| | | |
|---|---|---|
| DE | 4240429 | 6/1994 |
| WO | 2006112691 | 10/2006 |
| WO | 2008030095 | 3/2008 |
| WO | 2010089329 | 8/2010 |
| WO | WO 2010089329 A1 * | 8/2010 .............. A47J 31/22 |

* cited by examiner

BEVERAGE COLLECTOR FOR COLLECTING CENTRIFUGED LIQUID AND CENTRIFUGAL BEVERAGE MACHINE USING SUCH COLLECTOR

CROSS REFERENCE TO RELATED APPLICATIONS

The present application is a National Stage of International Application No. PCT/EP2012/065317, filed on Aug. 6, 2012, which claims priority to European Patent Application No. 11176918.8, filed Aug. 9, 2011, the entire contents of which are being incorporated herein by reference.

FIELD OF THE INVENTION

The present invention relates to the field of beverage machines such as coffee machines, in particular, machines using the centrifugal forces for brewing beverages. The invention more particularly relates to an improved beverage collector and a beverage machine comprising such collector.

BACKGROUND OF THE INVENTION

The preparation of a coffee consisting of extracting a liquid by centrifugation from a mixture of solid ingredients and hot water is known. By virtue of the centrifugal forces, the brewed liquid is forced through small interstices such as a peripheral filter, perforated holes, slits and/or a valve. Typically, the brewed liquid is ejected at relatively high centrifugal velocity from the rotating brewing device and is collected in an annular collector surrounding the device.

WO2010089329 relates to a device and method using centrifugation for extracting a liquid. Typically, the collector comprises a U-shaped profile extending circumferentially about the axis of rotation along an annular path which is in fluid communication with a beverage discharge duct. Since the collector forms a large surface of contact with the beverage, a solution consists in associating a heating element to the collector for compensating the thermal losses of the beverage thereby maintaining an optimized temperature of the served beverage. Other different ways of compensating the thermal losses can be contemplated.

A problem lies in the evacuation of the beverage from the collector for the dispensing of the beverage. The evacuation rate of the beverage may negatively impact on the quality of the beverage. An abnormal evacuation of the beverage from the collector may greatly impact on the temperature consistency of the beverage as well as on the quality of the coffee crema or foam.

In particular, the efficient transfer of the heating power within a given range of flow rate is determinant for the quality of the coffee. For example, the beverage can be cooled or portions of the beverage residing too long in the collector may burn and impact the taste of the full beverage.

The cream or foam of the coffee may also be impacted if the coffee evacuation is not properly controlled.

The cleanliness of the device may also be affected in particular if liquid sits in the collector causing dried food solid to accumulate on the surface of the device.

The present invention aims at providing an improved arrangement of the collector which partially or totally solves these problems.

For this, the present invention is defined by the main claim. The dependent claims further define the preferred aspects of the invention.

SUMMARY OF THE INVENTION

The present invention relates to a beverage collector for collecting a centrifuged brewed liquid coming from a rotating brewing unit; said collector comprising:
- a collecting track forming a cavity annular around a central axis and,
- at least one outlet extending circumferentially and radially in a portion of the collecting track for allowing the brewed liquid received in the collecting track to evacuate out of the collecting track, wherein said collecting track comprises at least one ramp surface lowering in the annular direction towards the outlet.

Therefore, such arrangement promotes the evacuation of the beverage, e.g., brewed coffee, in the collector, reduces considerably its residence time and confers more stability to the created 'coffee crema'.

Preferably, the at least one ramp surface merges with at least one circumferential end of the outlet.

Generally, the ramp surface of the collecting track has the form of a portion of helix or a portion of spiral. The form of helix requires the ramp surface to extend substantially along the annular direction of the collecting track and at a same distance from the said central axis. The form of spiral does not require the ramp surface to extend strictly in the annular direction but may slightly run at a continuously increasing or decreasing distance from the central axis.

The length of the ramp surface should be sufficient to provide an effective evacuation. Therefore, preferably, the at least one ramp surface extends along an angular path of at least 250 degrees (angle), more preferably at least 320 degrees (angle), of the annular track.

In a preferred mode, the ramp surface extends from the vicinity of the highest circumferential end of the outlet to the lowest circumferential end of the outlet. In order words, the outlet is placed just as close as possible to the start line and the finish line of the ramp surface. Possibly, small merging sections may link the ramp with the outlet such as a small upper ramp portion of reverse slope to prevent liquid sitting on top of the ramp surface in the collector.

The ramp surface preferably comprises a higher point and a lower point which are axially distant one another of a distance of at least 3 mm, preferably comprised between 4 and 20 mm. The outlet preferably also preferably extends, in the annular direction, in an inclined fashion relative to radial plane of the collector in order to form a "mouth" for the liquid running circumferentially in the collecting track. The outlet may also be oriented parallel the central axis.

The outlet may take various forms such as squared, rectangular, circular, triangular, trapezoidal, circular, polygonal, ovoid or oblong. The outlet may also be formed of several grouped openings.

In a mode, the ramp surface may be continuously lowering towards the outlet. By continuously lowering, it essentially means that there is no flattened surface portion along the annular direction of extension of the ramp surface and no abrupt decreasing lines. However, the slope of the ramp surface may form a linear, concave or convex profile or a combination of these profiles.

In a less preferred mode, the ramp surface is discontinuously lowering towards the outlet. By discontinuous lowering, it is meant that the ramp surface may decrease stepwise with possibly small portions of flat portions followed by steep sloped portions and/or decrease stepwise by sloped portions separated by abrupt or vertical transition surfaces.

The annular track preferably comprises an annular inner upright wall and an annular outer upright wall bordering the outlet and ramp surface. These walls enable to guide the beverage to the outlet while avoiding it to flow over the collector. Preferably, the inner and outer walls merge with the ramp surface by relatively convex merging portions to ensure a smooth guidance of the beverage flow. In other words, the track design is optimized to reduce as much as possible the residence time of the coffee inside it.

Preferably, the outlet extends by a conduit below the track which is directed in the annular direction or directed tangentially to said direction or which progressively diverges from said direction. Again, this arrangement promotes a straighter evacuation of the liquid from the collector while preserving the quality of the coffee 'crema'.

Furthermore, flow obstructing means are preferably present downstream the outlet conduit below the collecting track. This flow obstructing means serve to slow the liquid flow down passed the annular collecting track before it exits the collector. In particular, the flow obstructing means comprises at least one transversal wall extending across the direction of the conduit downstream the outlet.

More particularly, the flow obstructing means may comprise at least one chicane present between the outlet and a beverage discharge duct. The term "chicane" essentially means a conduit which is geometrically arranged and/or partially separated by wall(s) to guide the flow in at least two diverging directions, e.g., opposite directions. The beverage discharge duct may advantageously be oriented substantially transversally to the plane of the chicane and/or direction of the conduit downstream the outlet.

In a preferred mode, the annular collecting track is associated with heating means. In particular, the collecting track may be formed in a heated block or be associated in heat conductive manner to a heated block. The block may be made of metal, ceramic or heat resistant plastic. The heated block may embed at least one heating element such as a heating cartridge, a heating resistance or a thick film. The at least one heating element extends over an annular portion of at least 200 degrees (angle), more preferably at least 320 degrees (angle), most preferably between 340 and 360 degrees (angle).

The invention further relates to a beverage collector for collecting a centrifuged liquid coming from a rotating brewing unit; said collector comprising:
- a collecting track forming an annular cavity and,
- at least one outlet extending radially in the collecting track for allowing the liquid received in the collecting track to evacuate out of the collecting track,
- wherein said collecting track is made of a heated block or is associated in heat conductive manner to a heated block.

In particular, the heated block embeds at least one heating element. The block may be made of metal, ceramic or heat resistant plastic. The heated block may embed at least one heating element such as a heating cartridge, a heating resistance or a thick film. Furthermore, the heating element or heating elements extend over an annular portion of at least 320 degrees (angle). The heated block is preferably made of a heat conductive metal. The metal may be chosen amongst aluminum, copper, brass, steel, alloys or blends of such metals and combinations thereof.

Preferably, the collecting track comprises on its surface in contact with the liquid a coating made of a foodgrade material resisting to abrasion and having reduced food sticking properties. In particular, the coating is made of fluoro-polymer(s).

The invention, independently or in relation to the previously described characteristics, further relates to a beverage collector for collecting a centrifuged liquid coming from a rotating brewing unit; said collector comprising:
- a collecting track forming an annular cavity and,
- at least one outlet extending radially in the collecting track for allowing the brewed liquid received in the collecting track to evacuate out of the collecting track,
- wherein the said outlet extends by a conduit below the track which is directed in annular direction or tangentially to said direction or diverging outwardly to said direction and
- wherein flow obstructing means are present downstream the said outlet to flow the brewed liquid down downstream of the collector.

Preferably, the flow obstructing means comprises at least one transversal wall extending across the direction of the said conduit downstream the outlet. Preferably, the flow obstructing means further comprises at least one chicane present between the outlet and a beverage discharge duct. Preferably, the beverage discharge duct is oriented substantially transversally to the plane of the chicane and/or to the said conduit The invention further relates to a centrifugal beverage machine comprising a beverage collector as previously defined.

More particularly, the machine comprises a rotating brewing unit arranged to be rotated in a given rotational direction and a collector as previously mentioned; the collector being disposed around the rotating brewing unit, the collector comprising an annular collecting track comprising a ramp surface which lowers in the rotational direction of the rotating brewing unit. The lowering of the ramp surface directed in the rotational direction further promotes an efficient evacuation of the liquid in the collector.

The invention will be further described in relation with the appended drawings.

DETAILED DESCRIPTION OF THE DRAWINGS

Figure 1:
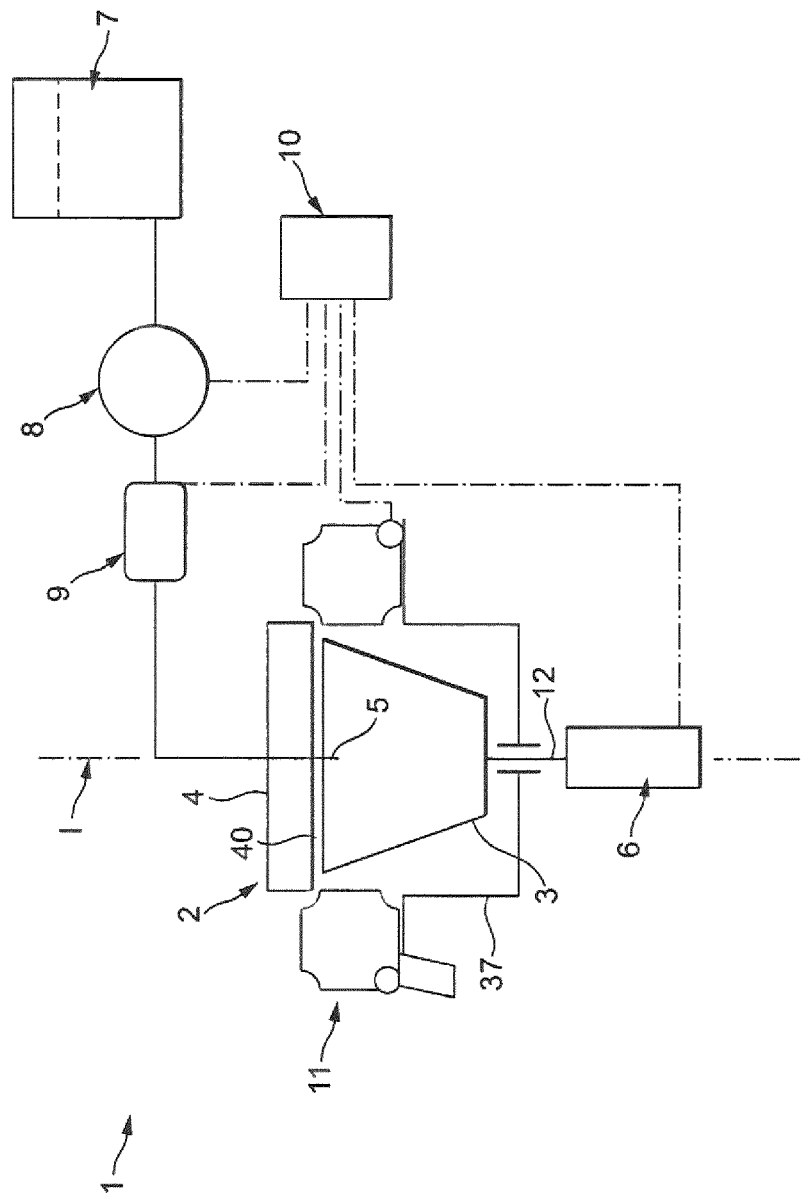
FIG. 1 is a schematic illustration of a beverage machine comprising the collector of the invention.
Figure 2:
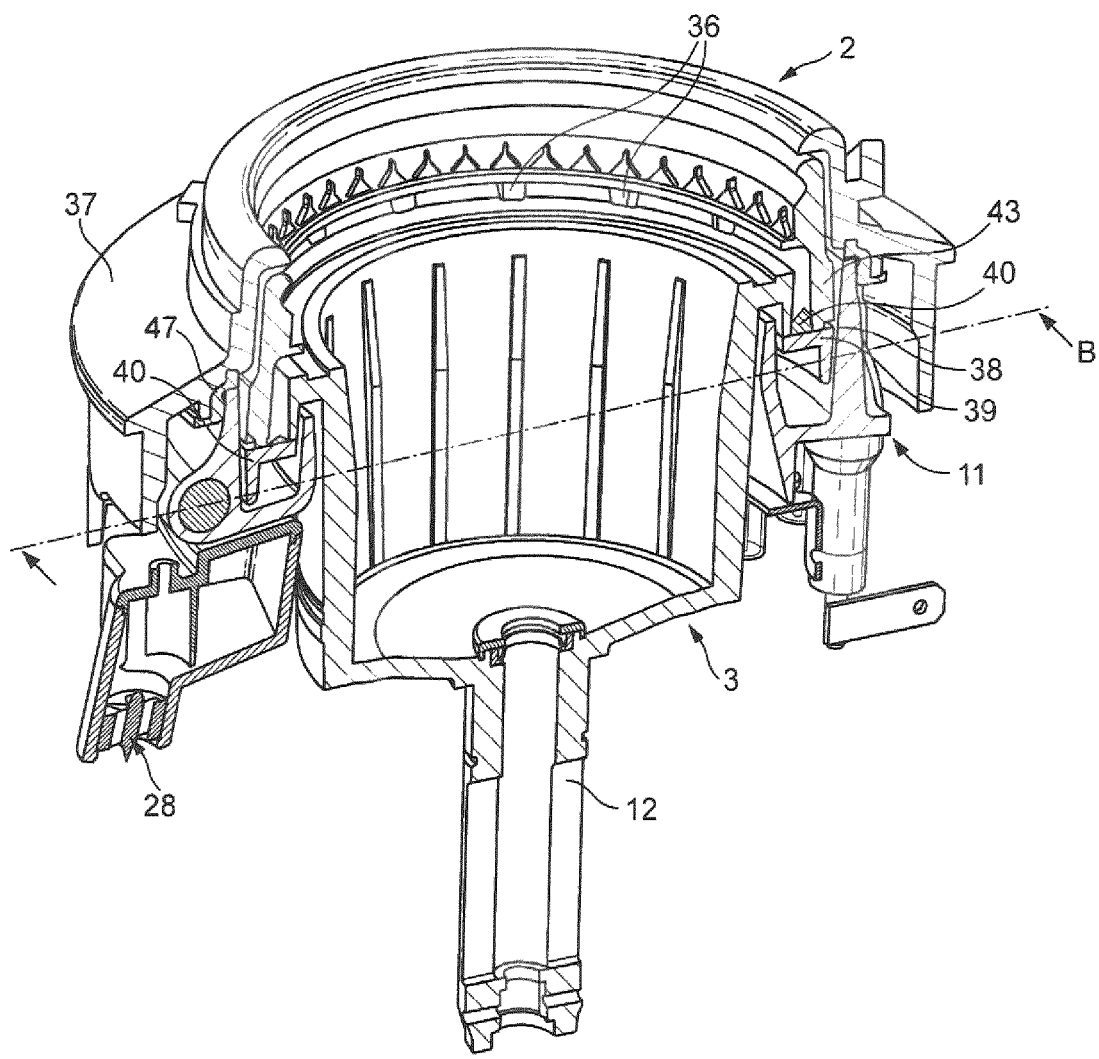
FIG. 2 is a partial perspective cross-sectional view of the machine of FIG. 1.
Figure 3:
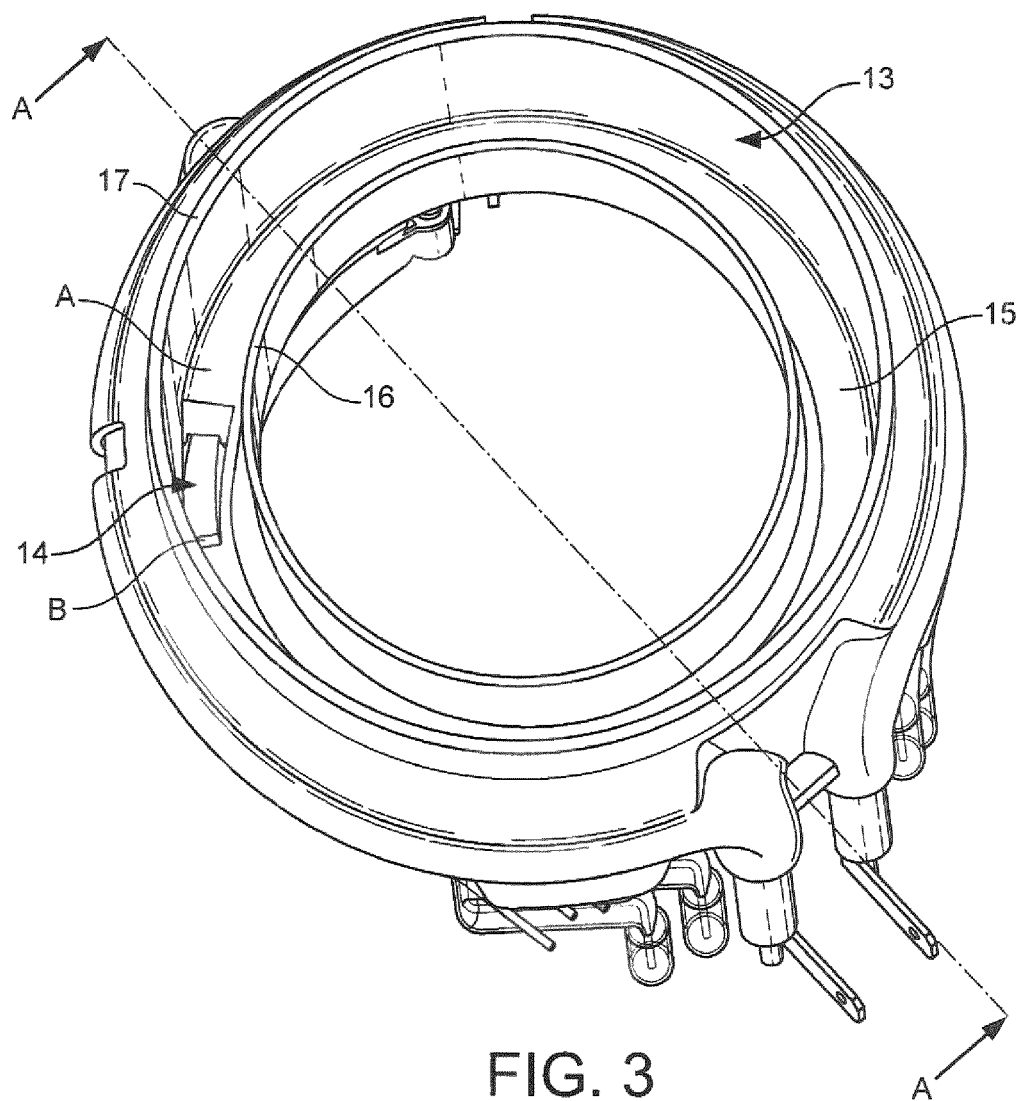
FIG. 3 is a perspective top view of the collector of the invention.
Figure 10:
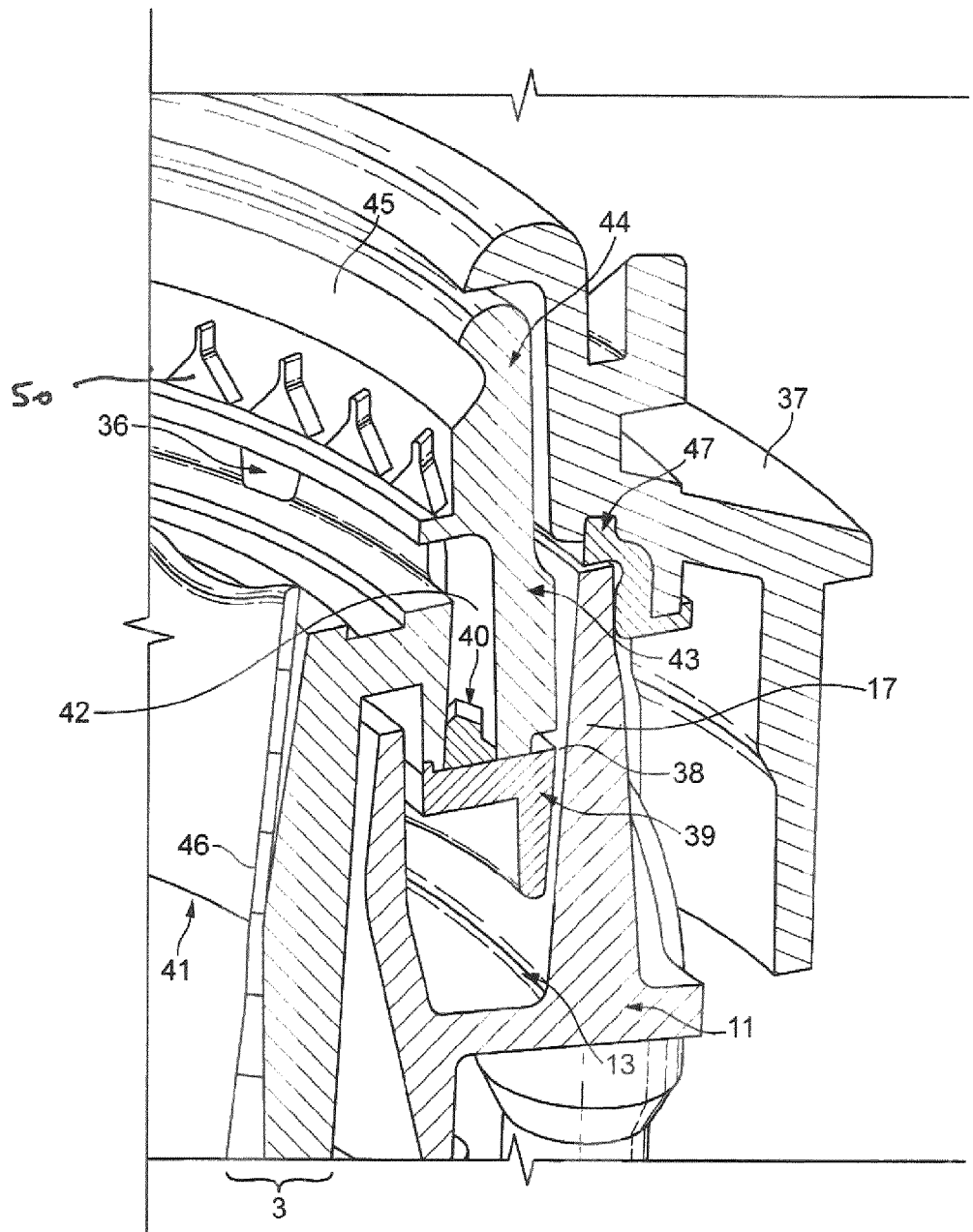
FIG. 10 shows a detailed cross section view of a machine according to a preferred mode of the present invention.

A general illustration of the centrifugal beverage machine 1 of the invention is illustrated in FIG. 1. It generally comprises a brewing unit 2 arranged to rotate at elevated rotational speed along an axis of rotation "I". The rotating brewing unit 2 comprises a beverage ingredient holder 3 and a liquid feeder 4. In brewing operation, the holder and liquid feeder are assembled together via connection means (not shown) so that they are rotated together at the same rotational speed. Flow release means are provided for enabling the flow of brewed liquid to leave the brewing unit, such as, for instance, between the holder and the liquid feeder or in the holder itself. The flow release means can be formed as an annular gap 40 as illustrated in FIG. 1, conduit(s) and/or holes. Other examples of flow release means including holes 36, 40 separated by a channel 42 are visible in FIGS. 2 and 10. For instance, FIGS. 2 and 10 show another configuration with a plurality of peripheral outlets 40 such as throughholes provided in an outer wall 43 of the beverage ingredient holder 3. These outlets 40 are arranged for allowing communication of the centrifuged brewed liquid from the inner side of the holder (compartment 41) to the outer side of the holder in the upper region of the holder. These flow release means will be detailed later in the description but they are not necessarily limiting the scope of the invention.

The rotation of the brewing unit is obtained by the assembling of the holder 3 and liquid feeder 4 in rotational engagement in the frame of the machine and by driving the holder or liquid feeder via a rotary motor 6. In the present example, the holder comprises a rotational axle 12, mounted via bearings to a lower frame 37, which is linked to the motor 6 for enabling the holder to be driven in rotation and thereby to drive the feeder 4 indirectly.

The holder 3 may comprise a cup-shaped compartment for receiving beverage ingredients or a portioned package such as a capsule containing beverage ingredients (e.g., ground coffee). Depending on the machine, in particular, depending on the design of the brewing unit, beverage ingredients such as ground coffee can be directly loaded into the holder or, alternatively, be contained in a single or refillable capsule which is loaded into the holder (not shown).

The liquid feeder 4 is arranged to supply liquid in the brewing unit for mixing with the beverage ingredients contained in the holder. For this, a liquid injector 5 is provided along the rotational axis of the feeder. The liquid injector may be a tube, a lance or needle which is arranged to inject liquid in the compartment. Liquid is supplied to the liquid feeder from a liquid reservoir 7 of the machine or, alternatively, from an external source of liquid, such as a potable water supply. A suitable pump 8, such as an electric pump, is in fluid communication with the liquid conduit between the reservoir and the liquid feeder and operable to deliver liquid from the reservoir 7 to the injector 5. The pump may be a centrifugal or piston pump or any other type of suitable pump. The pump is electrically connected to a control unit 10 that operates the pump to control the flow rate and quantity of liquid delivered to the brewing unit. It is understood that the machine may not include a pump. For example, the machine may be configured to deliver water to the brewing unit by gravity. In one such example, the liquid reservoir 7 may be positioned above the liquid injector 5 and the liquid supply line may comprise at least one control valve (not shown) for opening and closing the injector or reservoir.

The machine preferably comprises a heater 9 for heating liquid before it is dispensed through the injector 5 of the liquid feeder 4. For example, the heater can be an instant heater or a thermo-block. Liquid entering the heater may be heated to a temperature which corresponds to the optimal brewing temperature of the beverage to be prepared. For this, at least one liquid temperature sensor is usually provided at and/or downstream of the heater to ensure that the temperature of the liquid exiting the heater or entering the brewing unit does not exceed a defined threshold or profile of temperature. The control of the temperature by the heater and sensor(s) is further processed by the control unit 10 which receives the temperature input from the sensor and switches the heater on and off in a manner to control the defined threshold or profile of temperature.

It should be noticed that the control unit 10 (e.g., a microcontroller) is adapted to control various functions of the beverage machine, in particular, the rotational speed of the brewing unit which also determines important brewing characteristics such as the beverage flow rate. The machine may also include a user interface (not shown) to allow the user to select, for example, a desired volume of beverage and/or to interrupt the brewing cycle at a desired time. The user interface may also allow for the user to make other selections, including, but not limited to, a temperature of the end product beverage, or trigger the discharge of other components such as milk in the beverage from a different module of the machine (not shown). Of course, certain selections can be automatically run such by identification of a code on a capsule containing the beverage ingredients.

According to an aspect of the invention, the beverage machine comprises a beverage collector 11 for collecting the brewed liquid being centrifuged from the brewing unit 2. For this, the collector comprises an annular collecting track 13. The collector preferably extends in an annular fashion at the periphery of the brewing unit.

FIGS. 3 to 7 show a preferred, but non-limiting, embodiment of the beverage collector of the invention.

Figure 5:
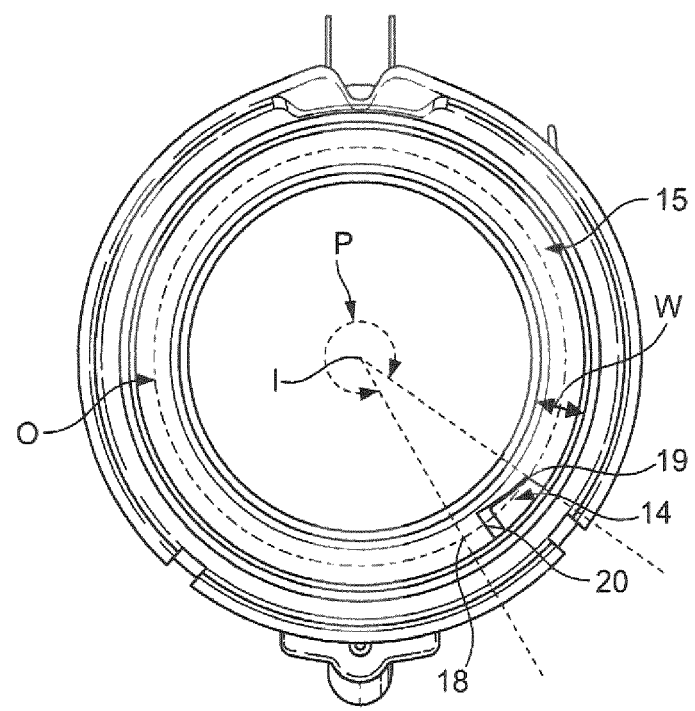
FIG. 5 is a top plane view of the collector of FIGS. 3 and 4.

The annular collecting track 13 comprises a ramp surface 15 extending in the annular direction "O" as shown in FIG. 5. The collector further comprises at least one outlet 14 which is present in the collecting track. The outlet 14 extends both in the radial and annular directions. In the circumferential or annular direction, the outlet comprises a highest end and a lowest end opposite the highest end.

The collecting track preferably has a bottom wall onto which the ramp surface is defined. The ramp surface lowers in the annular direction "O" towards the outlet. More preferably, the ramp surface is an helix-shaped surface. The track may be further demarcated by an annular upright inner wall 16 and an annular upright outer wall 17. These two walls and the bottom wall define together the collecting track which may thus take a substantially U-shaped form in the transversal cross-section of the collector. The ramp surface lowers in that, considering the outlet 14 as the reference, the ramp surface presents a higher point 18 and a lower point 19; such points 18, 19 being annularly distant one another in the collecting track. Preferably, the ramp surface extends along an angular path "P" which is at least of 250 degrees (angle), more preferably at least 300 degrees (angle) of the track. For example, for a ramp surface of about 350 degrees (angle), the axial height between the higher point 18 and the lower point 19 is comprised between 3 and 20 mm. It should be noticed that the ramp surface 15 is not necessarily flat in transversal cross-section but could as well be concave. Even, the ramp surface could be limited to a point in transverse cross-section of the collector or an helix-shaped line following the direction "O" so that the inner and outer walls merge in a lowest point in order to confer a V-shaped form to the collecting track.

Preferably, the ramp surface merges with the lowest circumferential end of the outlet. In other words, lower point 19 of the ramp surface coincides with said lowest end of the outlet 14 or at least stands slightly above it. As a result, liquid can drain from the ramp surface directly to the outlet without forming a sitting zone for residual liquid before the outlet.

Similarly, the ramp surface preferably ends close to or at the outlet. In the illustrated example, the higher point 18 of the ramp surface ends close to the upper or highest circumferential end of the outlet. In such arrangement, a second ramp surface 20 of reverse slope and smaller angular length is provided between the main ramp surface 15 and the upper end of the outlet 14. As a result, liquid is also guided down to the outlet in this transitional area of the track.

As illustrated, the ramp surface forms a continuously lowering surface towards the outlet. It could be possible to have a discontinuous lowering, such as a stepwise evolution of the lowering, although such arrangement would be less preferred.

The configuration of the outlet 14 may greatly vary. However, for all modes of the invention, the outlet preferably extends circumferentially in an inclined fashion relative to the annular plane of the collector (i.e., the plane normal to axis I). The inclination is oriented inversely to the inclination of the ramp such that outlet forms a sort of "mouth" for receiving liquid circulating in its direction in the track. Preferably, the outlet extends across at least 0.5 time, most preferably at least 0.75 time the largest width "W" of the collecting track. Preferably, the outlet is substantially equal to the largest width. The cross-section of the outlet may depend on various factor, in particular, it is sufficiently wide to allow a rapid evacuation of the liquid collected from the centrifugal brewing unit. In general, the outlet comprises an overall opening surface area comprised between 20 and 300 mm². A preferred design is an outlet having a longer circumferential length and a shorter radial width. The shape of the outlet may also vary. It may be rectangular, square, triangular, trapezoidal, circular, ovoid, oblong, etc. The outlet may also be formed of several openings such as to form a grid or a screen for the beverage.

The number of outlets may also vary in the collecting track. For example, two or more outlets can be provided, at an annular distance separated one another, in the collecting track and be separated by ramp surfaces. For instance, two outlets may be distributed at about 180 degrees (angle) in the collecting track and be separated on each end by a ramp surface. The number of outlets can be of two, three or more. In order to obtain a proper drainage of the centrifuged liquid in the collecting track, at least one ramp surface is provided in the annular area between the outlets.

Figure 6:
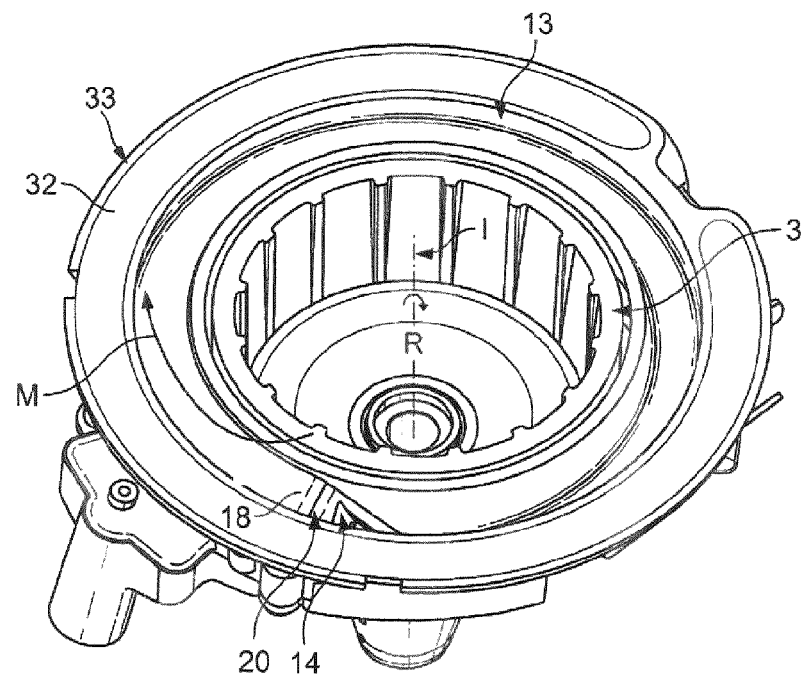
FIG. 6 is a partial perspective cross sectional view along B-B of the machine of FIG. 2.

In a preferred arrangement of the collector in the machine illustrated in FIG. 6, the rotating brewing unit is arranged to be rotated in rotational direction R, e.g., in clockwise direction, and the collector is disposed about the rotating brewing unit (only a partial view of the holder 3 is shown for sake of clarity). The ramp surface of the collecting track is arranged to lower in the rotational direction R of the rotating brewing unit. Therefore, the surface progressively lowers towards the momentum direction "M" of the liquid flow as illustrated in FIG. 6.

Figure 4:
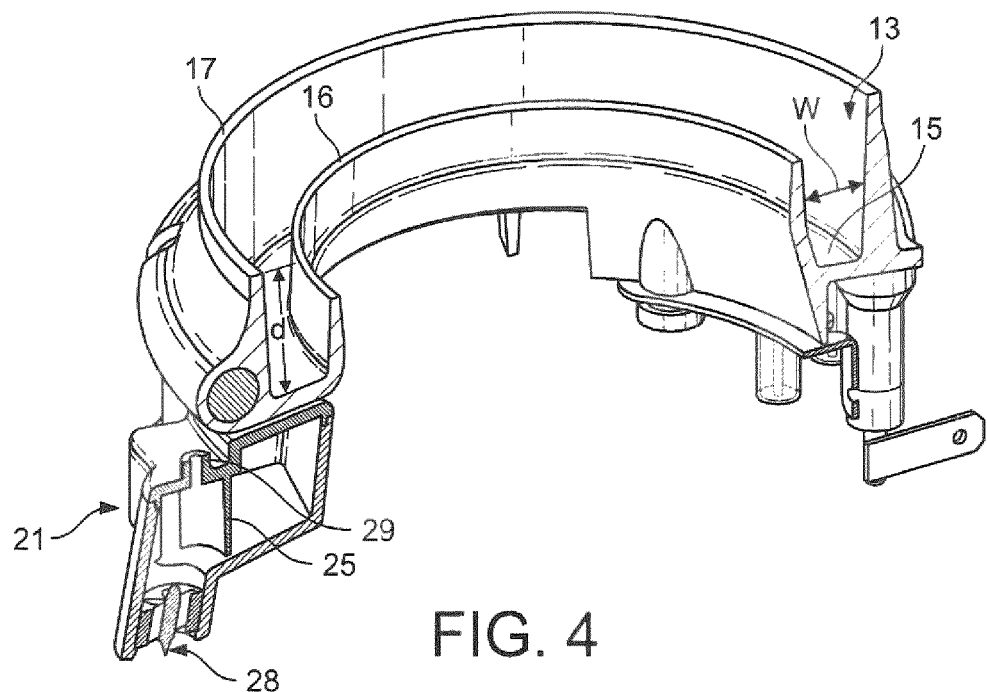
FIG. 4 is a cross-sectional perspective view along A-A of the collector of FIG. 3.

In a preferred arrangement, the collecting track 13 is further arranged with an upright outer wall 17 defining a depth "d" of the track which increases as the ramp surface lowers (FIG. 4).

Figure 8:
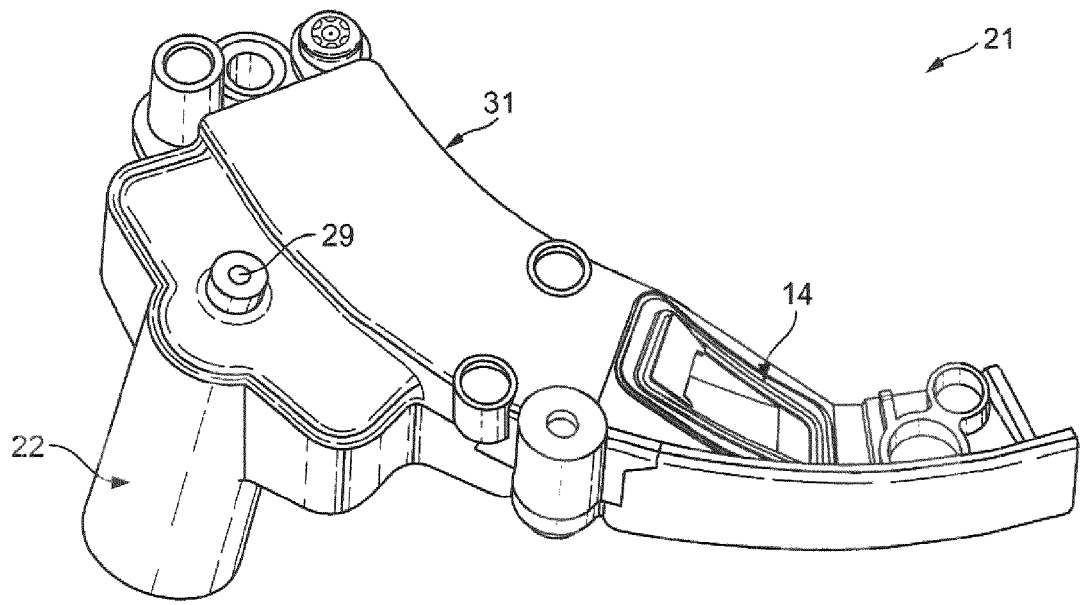
FIG. 8 is a perspective view of the beverage discharge assembly of the collector.
Figure 9:
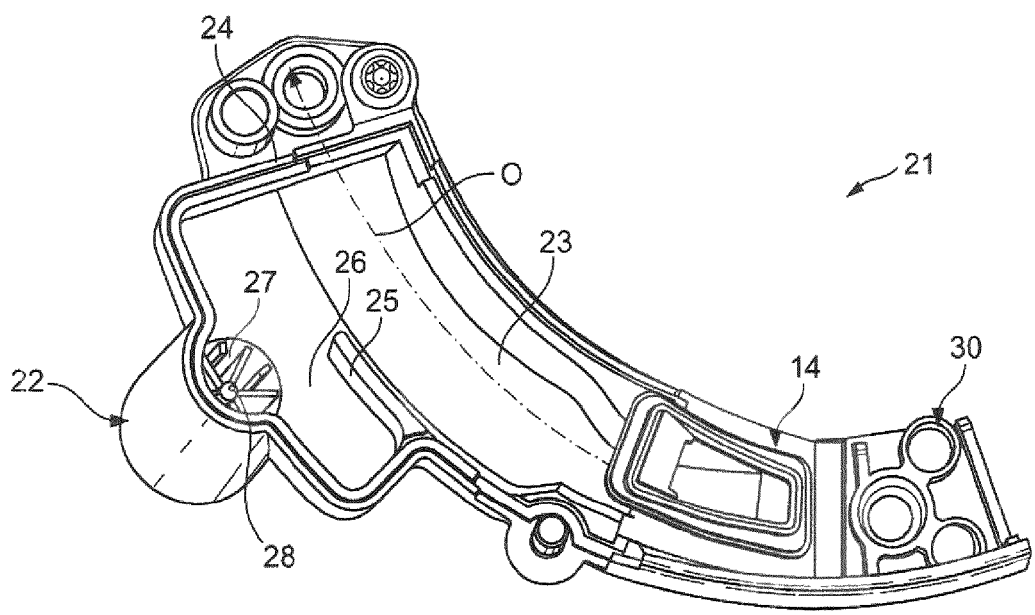
FIG. 9 is a partial internal view of the discharge assembly of FIG. 8 without its cover.

FIGS. 8 and 9 illustrate a preferred embodiment of the beverage discharge assembly 21 of the collector of the invention. Such assembly is associated to the collecting track to guide the beverage passed the outlet 14 to a discharge duct 22. The outlet 14 thereby extends by a discharge conduit 23 located below the collecting track and oriented in the annular direction "O" or concentrically to the direction "O" or tangentially to such direction or even diverging in curve to said direction. The discharge conduit can be curved or rectilinear. Preferably, a flow obstructing means is provided in the discharge assembly which is arranged to slow the liquid flow down once it passed the outlet. In particular, a transversal. e.g. radial, wall 24 extends across the direction of extension of the conduit 23 downstream the outlet. Therefore, the flow of liquid passing through the outlet with high momentum is suddenly stopped by the transversal wall 24. Moreover, a chicane 25 can be designed in the discharge assembly to further re-orient the flow. The chicane 25 may be designed to partially separate the conduit 23 with a second conduit or chamber 26 which is capable to contain enough liquid to prevent backflow of brewed liquid in the collecting track.

Further downstream of the conduit 23, a discharge duct 22 is provided which is preferably, although not necessarily, oriented transversally to the annular direction "O". The duct 22 may comprise a conduit 27. Such conduit may also be provided with means for smoothening the flow of liquid or "flow breaker" such as a grid or flow separating structure 28. The beverage discharge assembly may also further comprise an air hole or conduit 29 on top of the discharge duct to equilibrate pressure in the discharge duct.

Figure 7:
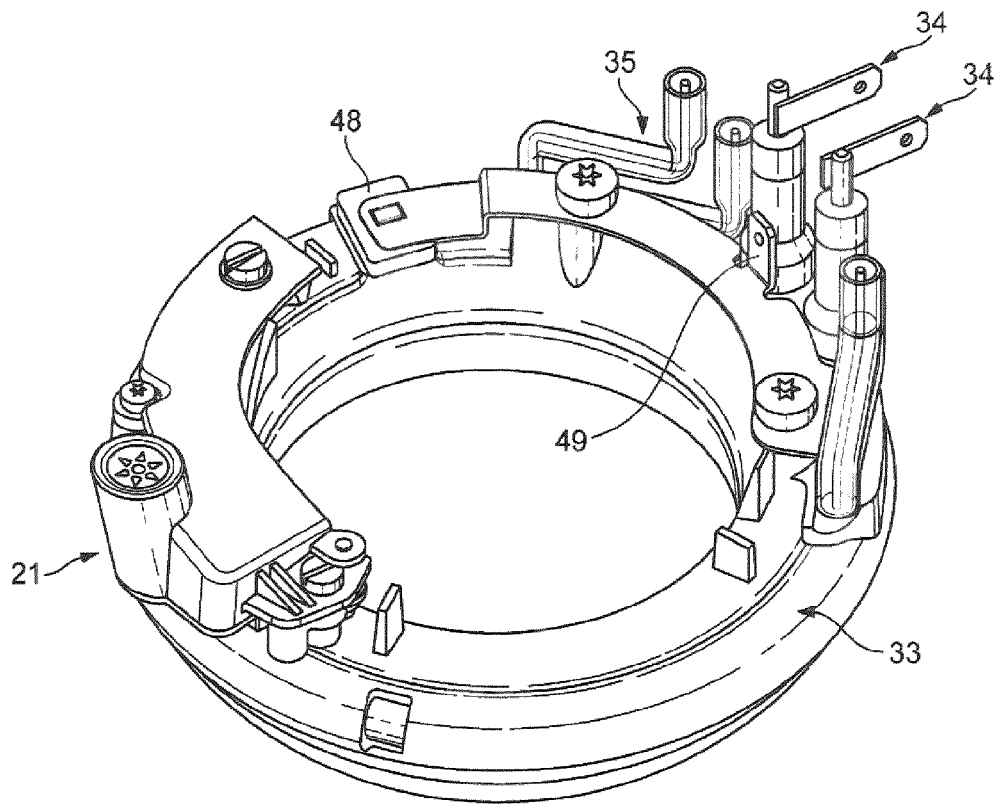
FIG. 7 is a bottom perspective view of the collector of FIGS. 3, 4 and 5.

It should be noticed that the beverage discharge assembly 21 may be formed of moulded plastic and/or metal parts such as a housing 30 and a cover 31 assembled onto the housing. The housing may comprise the main wall structure, i.e., the wall 24, chicane 25 and duct 22 The assembly of these two parts can be obtained by riveting, screwing and/or welding. The assembly may be easily connected to the collecting track 13 by screwing, riveting and/or welding as shown in FIG. 7. Of course, other assembling structures can be envisaged which differ from the present one without departing from the scope of the present invention.

In another aspect of the collector of the invention which is illustrated in FIGS. 4, 6 and 7, the annular collecting track 13 is heated. For this, the track is made of or otherwise thermally associated to a heated block 33. Preferably, the heated block embeds at least one heating element 32. The heating means, such as one or more elements, preferably extends over an annular portion of the track. More preferably, it extends along an annular path of at least 300 degrees (angle), more preferably at least 320 degrees (angle), most preferably at least 340 degrees (angle). The heating element is connected to electrical wires 35, electrical connectors 34 and earth connector 49 shown only in partial representation.

The heating element may be positioned in the block to surround the collecting track for reasons of good integration of the collector in the machine, in particular, in view of the inside positioning of the brewing unit. For this, the heating element 32 has a wider diameter than the diameter of extension of the collecting track 13 (FIG. 6). However, other arrangements could be envisaged such as one or more heating elements of same or smaller diameter placed below or above the track.

The heated block may be made of metal material having high heat conductivity such as copper, brass, aluminium, steel and the like. A heat element may be a heating resistance, a heating cartridge or a thick film. When the heated block also forms the collecting track, it may be necessary to have a food-grade protective coating such as a fluoropolymer coating (e.g., TEFLON, ILAFLON). The coating may be chosen to have high abrasion resistance and non-stick properties to food. For safety reasons, the collector and its electrical means may be further thermally and electrically insulated from the rest of the machine by plastic pieces and/or sheath, e.g., Teflon.

The temperature control of the heated block of the collector can be carried out by at least one temperature sensor 48, e.g., NTC element(s), placed in contact with or embedded in the heated block. The regulation temperature range of the collector may be comprised between 60 and 100° C. The temperature may vary depending on the beverage type, the quantity of discharge beverage and/or the flow rate. The temperature or a profile of temperatures may also be controlled in such a manner that the temperature of the heated block decreases as the flow rate is lower and/or the quantity of beverage (e.g., coffee) becomes smaller. The heated block may further comprise one or more electrical fuses which cut the current to the heating element(s) for preventing overheating of the collector.

Considering the more detailed view in FIG. 10, the brewing unit is arranged with the collector in the machine such that the upright outer wall 17 of the collector also forms with the rotating brewing unit, a liquid projection gap 38.

More particularly, the beverage ingredient holder extends by an outlet wall 43 which projects in the collector, in particular, in the collecting track. The outlet wall 43 comprises a plurality of outlets 40 enabling the brewed liquid to leave the brewing unit during the centrifugation process. The outlets 40 are in communication with inlets 36 of the holder via channels or an annular chamber 42. The inlets 36 are in communication with the compartment of the holder. For example, they are in communication with outlets provided in a (coffee) capsule received in the compartment (not shown). The liquid projection gap 38 represents the radial distance or width measured at the outlets 40, between the outlet wall 43 of the beverage ingredient holder 3 and the inner surface of the outer wall 17. Such liquid projection gap further extends down to finally open to the collecting track 13 for enabling the collecting track to collect the liquid being projected onto the outer wall 17 from the inlets 36 of the brewing unit by effect of the centrifugal forces during brewing of the beverage. Importantly, this radial width of the liquid projection gap 38, also representing the "flying distance" of the liquid being projected from the holder onto the outer wall 17 of the collector, is controlled to provide an optimal formation of the beverage foam, in particular, for coffee, a thick and persistent "crema" including fine bubbles. It is supposed that the texture and thickness of the foam is created in this liquid projection gap 38. For this, the preferred radial width ("flying distance" for the brewed liquid) of the liquid projection gap 38 is measured at the edge of the outlets 40 which is positioned the closest to the outer wall 17. Such flying distance or width is comprised between 0.5 and 1.5 mm, more preferably between 0.7 and 1.0 mm, most preferably at about 0.8 mm. It should also be noticed that the outlets 40 can be replaced by a continuous slit provided in the holder without departing from the scope of the present invention.

It should be noted that the particular structure of the beverage ingredient holder shown in FIG. 10 represents a preferred mode but does not limit the scope of the present invention. The holder is designed for providing a better integration to the collector while controlling the flow of liquid through the liquid projection gap 38 as discussed. It is also designed to facilitate its connection to the liquid injection feeder such as it is described in co-pending PCT/EP11/061,083 entitled: "Device for preparing a beverage by centrifugation".

For example, the holder 3 can be designed to receive a beverage capsule (not shown) in its compartment 41. The compartment may be equipped with a capsule ejection mechanism 46 such as also described in co-pending European patent application No. 11167862.9 entitled: "Device and method for retrieving a capsule from a beverage production apparatus". When the brewing unit is rotated at elevated speed, brewed liquid is forced through peripherally distributed inlets 36 of the holder. The brewed liquid is thus projected in channel(s), or a chamber 42, which re-distribute the liquid through the outlets 40. A lower closure wall portion 39 of the wall 43 also closes the bottom of the outlets 40 and forces the flow radially towards the outer wall of the collector. The brewed liquid is thus allowed to enter the liquid projection gap 38 down to the collecting track 13.

An upper seal 47 may also be provided between the outer wall and the frame 37 to ensure that liquid cannot flow over the collector. The brewed liquid then travels to the discharge assembly of the collector as already discussed and is collected in a receptacle such as a cup or mug. In other possible beverage machines, the design of the beverage ingredient holder can be simplified. For instance, in a different design (not shown), a simple array of outlets in another wall of the holder can be envisaged to allow the communication between the compartment and the liquid projection gap 38.

The beverage ingredient holder 3 may further comprise a portion of wall 44 extending upwardly opposite the outlet wall 43 for enabling the connection of the holder to the liquid feeder of the brewing unit. In other words, this portion of wall enables the closing of the brewing unit for the centrifugation process. This portion of wall 44 may comprise connection means such as an annular groove 45. The groove 45 may be oriented inwardly and be shaped to receive one or more complementary connection means of the liquid feeder such as spring-biased pins (not shown) as described in co-pending international patent application PCT/EP11/061083.

Additionally, the connection portion may comprise mechanical gear means 50 extending annularly which are configured to fit to complementary gear means (not shown) of the liquid feeder. These gear means increases the torque resistance of the connection between the beverage ingredient holder and the liquid feeder. As a result, the gear of the liquid feeder by the holder driven by the motor is improved. The mechanical constraints on the inserted (beverage ingredient containing) capsule are also reduced so that it reduces the risk of damaging the packaging material of the capsule.

It should be noted that the invention can be applied to centrifugal beverage machines using portioned packages such as capsules or other types such as coffee machine which use ground coffee from a canister or a grinding device.

NUMERICAL REFERENCES TO FIGURES

1: Centrifugal beverage machine
2: Rotating brewing unit
3: Beverage ingredient holder
4: Liquid injection feeder
5: Liquid inlet
6: Driving motor
7: Liquid reservoir
8: Liquid pump
9: Liquid heater
10: Control unit
11: Collector
12: Rotational axle
13: Annular collecting track
14: Outlet of collecting track
15: Ramp surface
16: Inner wall
17: Outer wall 18: Higher point
19: Lower point
20: Second ramp surface
21: Beverage discharge assembly
22: Discharge duct
23: First conduit
24: Transversal wall
25: Chicane
26: Second conduit
27: Conduit of discharge duct
28: Flow breaker
29: Air hole
30: Housing
31: Cover
32: Heating element
33: Heated block
34: Electrical connectors
35: Electrical wires
36: Inlets or holes
37: Lower frame
38: Liquid projection gap
39: Holder closure wall portion
40: Holes or outlets
41: Compartment of the holder
42: Channel or chamber
43: Outlet wall of holder
44: Portion of wall for connection
45: Annular groove
46: Capsule ejection mechanism
47: Seal
48: Temperature sensor
49: Earth connector
50: Mechanical gear means

The invention claimed is:

1. A beverage collector for collecting a centrifuged brewed liquid coming from a rotating brewing unit, the beverage collector comprising:
    a collecting track forming a cavity annular around a central axis; and
    at least one outlet extending circumferentially and radially in a portion of collecting track for allowing the brewed liquid received in the collecting track to evacuate out of the collecting track,
    the collecting track comprises an annular upright inner walk an annular upright outer wall bordering the at least one outlet, and at least one ramp surface lowering in the annular direction towards the at least one outlet,
    the at least one outlet extends, by a conduit below the collecting track and is directed in the annular direction or is directed tangentially to the annular direction or progressively diverging from the annular direction,
    wherein the at least one ramp surface of the collecting track has the form of a portion of helix or a portion of spiral,
    wherein the annular track is made of or associated to a heated block in a heat conductive manner,
    wherein the heated block embeds at least one heating element,
    wherein the conduit extends between the annular upright inner wall and the upright outer wall.

2. The beverage collector according to claim 1, wherein the at least one ramp surface merges with at least one circumferential end of the at least one outlet.

3. The beverage collector according to claim 1, wherein the at least one ramp surface extends along an angular path of at least 250 degrees of the collecting annular track.

4. The beverage collector according to according to claim 1, wherein the at least one ramp surface extends from the vicinity of the highest circumferential end of the at least one outlet to the lowest circumferential end of the at least one outlet.

5. The beverage collector according to claim 1, wherein the at least one ramp surface is continuously declining towards the at least one outlet.

6. The beverage collector according to claim 1, wherein the at least one ramp surface is discontinuously declining towards the at least one outlet.

7. The beverage collector according to claim 1, further comprising a flow obstructing member downstream from the at least one outlet.

8. The beverage collector according to claim 7, wherein the flow obstructing member comprises at least one transversal wall extending across the direction of the conduit downstream from the at least one outlet.

9. The beverage collector according to claim 8, wherein the flow obstructing member comprises at least one chicane which is located between the at least one outlet and a beverage discharge duct.

10. The beverage collector according to claim 9, wherein the beverage discharge duct is oriented transversally to the plane of the chicane and/or direction of the conduit downstream from the at least one outlet.

11. The beverage collector according to claim 1, wherein the at least one ramp surface increases in distance from the central axis as the ramp surface progresses in the annular direction.

12. The beverage collector according to claim 1, wherein the at least one ramp surface decreases in distance from the central axis as the ramp surface progresses in the annular direction.

13. A centrifugal beverage machine comprising a beverage collector therein comprising:
    a collecting track forming a cavity annular around a central axis; and
    at least one outlet extending circumferentially and radially in a portion of collecting track for allowing the brewed liquid received in the collecting track to evacuate out of the collecting track,
    the collecting track comprises an annular upright inner walk an annular upright outer wall bordering the at least one outlet, and at least one ramp surface lowering in the annular direction towards the at least one outlet,
    the at least one outlet extends, by a conduit below the collecting track and is directed in the annular direction or is directed tangentially to the annular direction or progressively diverging from the annular direction,
    wherein the at least one ramp surface of the collecting track has the form of a portion of helix or a portion of spiral,
    wherein the annular track is made of or associated to a heated block in a heat conductive manner,
    wherein the heated block embeds at least one heating element, and
    wherein the conduit extends between the annular upright inner wall and the upright outer wall.

14. The centrifugal beverage machine according to claim 13, wherein the conduit extends between the annular upright inner wall and the upright outer wall.

* * * * *